(12) United States Patent
O'Keeffe et al.

(10) Patent No.: US 6,611,520 B1
(45) Date of Patent: Aug. 26, 2003

(54) INHIBITION OF UNDERRUN IN NETWORK SWITCHES AND THE LIKE FOR PACKET-BASED COMMUNICATION SYSTEMS

(75) Inventors: Daniel M O'Keeffe, Ballyhooly (IE); Justin A Drummond-Murray, Chorleywood (GB); Annette E Sohor, Dublin (IE); Paul Flood, Tigard, OR (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/386,482

(22) Filed: Aug. 31, 1999

(30) Foreign Application Priority Data

May 19, 1999 (GB) ............................................. 99114860

(51) Int. Cl.[7] .............................................. H04L 12/56
(52) U.S. Cl. .................. 370/389; 370/395.42; 370/412; 370/428
(58) Field of Search ............................. 370/389, 395.4, 370/395.41, 395.42, 412–418, 428–429

(56) References Cited

U.S. PATENT DOCUMENTS 4,788,679 A    11/1988   Kataoka et al.
5,546,391 A *  8/1996   Hochschild et al. ......... 340/2.1
5,602,852 A *  2/1997   Shiobara .................. 340/825.5
6,456,593 B1 * 9/2002   Iverson et al. ........... 370/235.1

FOREIGN PATENT DOCUMENTS

WO        WO 89/09446        10/1989

* cited by examiner

*Primary Examiner*—Seema S. Rao
*Assistant Examiner*—Inder Pal Mehra
(74) *Attorney, Agent, or Firm*—Nixon & Vanderhye PC

(57) ABSTRACT

A multi-port data communication device includes a common central memory through which all data packets must pass. Packet data is written to and read from the common memory space in bursts in response to receive write requests and transmit read requests. A transmit read request for a first burst of data in a packet has in a central arbiter a relatively low priority and transmit read requests for a second and any subsequent burst of data in a packet have in the central arbiter a relatively high priority. Preferably the receive write requests have in said central arbiter a priority intermediate said relatively low priority and said relatively high priority. The priority system reduces the likelihood of underrun and overrun particularly when the burst size is generally smaller than the packet size.

10 Claims, 3 Drawing Sheets

INHIBITION OF UNDERRUN IN NETWORK SWITCHES AND THE LIKE FOR PACKET-BASED COMMUNICATION SYSTEMS

FIELD OF THE INVENTION

This invention relates to packet-based communication systems such as 'Ethernet' systems wherein user data and other information is conveyed from station to station by means of data packets that in typical form comprise a preamble, address and control data, packet data and a frame check sequence

BACKGROUND TO THE INVENTION

The invention particularly relates to network devices which comprise some means for storage of packets received by the individual receive ports, a central or common memory into which all packets which are to be transmitted from the device are stored before they are transmitted, a plurality of transmit ports and some means for the temporary storage of packets read out from the common or central memory before they are dispatched from the transmit ports. Such a device may take a variety of forms but the generic term 'switch' is used herein to include hot merely switches in the narrow sense of a layer 2 interconnection device, but also other devices more commonly known as bridges, routers and repeaters so far as the provision of a central or common memory may be necessary or appropriate for use in such devices. It will be understood by those skilled in the art that although the foregoing, indicates both a plurality of receive ports and a plurality of transmit ports, it is common practice to provide a multiplicity of ports that can operate in a duplex manner, being capable of both reception and transmission and accordingly the terms 'receive' port and 'transmit' port are intended to include the receive and transmit functions respectively of ports that are capable of both transmission and reception.

Switches of this general character commonly include at the receive side a switching asic and associated storage, for example in the form of look-up tables which perform an examination of address data in received packets to build up a database of source addresses and to match destination addresses if possible with stored addresses in order to determine which port or ports should be employed for forwarding a received packet.

In modern systems, the demand for performance is often on the limit of what technology can provide. In packets with systems of this general nature, it is quite possible for the central common memory to be unable to accommodate the demands of traffic flow imposed by the stations connected to the switch in which that central memory is located. Two broad categories of memory failure in the sense are known, namely 'overrun' and 'underrun'.

A central common memory of the kind normally employed in switches is typically a dynamic random access memory which is organised as a multiplicity of buffer stores, identifiable in known manner by address signals provided by a memory controller. Normally, a buffer is not dedicated to any particular port but is allotted to receive data from the ports promiscuously under the control of the memory controller. Packets from the temporary storage space are read into a selected buffer or chain of buffers under the control of the memory controller and, when the data packets have been read out of that buffer or buffers, the said buffer or buffers return to a 'free pool' and are available for the storage of data packets from any of the ports. However, the invention is not limited to central common memories which are organised in that particular manner.

It is preferable to write packet data to the central memory and to read packet data from in bursts, which are preferably of a fixed size such as 128 bytes, in order to use the available bandwidth efficiently. However, the writing or reading of each burst has to be preceded by a respective 'request' to the central memory.

A condition of 'overrun' arises when a central common memory becomes oversubscribed, receiving more requests that it can accommodate such as when several sources attempt to obtain access simultaneously to the same block of memory. In the 'overrun' condition, the temporary memory for an individual receive port will (for example) fill up because the data in that temporary memory cannot be passed to the common central memory quickly enough The other condition, known as 'underrun' is used to denote the condition in which a transmit port commences the transmission of a packet but all the data for that packet cannot be read from the central memory quickly enough. If for example, owing to the existence of multiple requests to the central memory, the latencies associated with reading out a succession of bursts to a particular transmit FIFO may be significantly different and the result is likely to be a gap in the transmission of the packet.

Both overrun and underrun are likely to occur when the burst size is smaller than the average packet size.

The transmission of a packet in an Ethernet switch includes, as indicated above, a frame check sequence which indicates if the packet has been corrupted. Once transmission of a packet has started, if an underrun occurs, causing a break in the data, the packet will be corrupted and therefore be transmitted with a frame sequence check error. One object of the present invention is to avoid erroneous packets being transmitted by virtue of the occurrence of underrun in a common central memory.

SUMMARY OF THE INVENTION

This invention is broadly based on the employment of two levels of priority for read requests for data bursts from a common central memory. More particularly, a first priority is preferably a low priority request made at the beginning of a packet. Such a request would have normally the lowest priority with respect to the central memory. The second request is a high priority request, which preferably has a higher priority that the receive ports and is preferably asserted for all transmit bursts from memory after the first.

The provision of a low priority request at the beginning of a packet will avoid or help to avoid the problem of over subscription of the central.

The provision of a second request with a higher priority means that as soon as transmission of a packet has begun it is less likely to be subject to data corruption due to underrun However, too many high priority requests would cause the receive temporary storage to overrun According to a further aspect of the invention, each transmit port may issue only a limited number of high priority requests before transmission of the current packet has finished. The next request from the port will be a low priority request for the start of the next packet. Thereby any backlog which may have built up in the receive temporary storage while the high priority read requests were being serviced can now be cleared before transmission of the next transmit packet occurs. An overrun on the receive side may thereby be prevented.

As indicated previously, the transmission of a packet in an Ethernet switch has several parts, the first part being an inter-packet gap (IPG) which is a compulsory quite time on the transmission link, for example the wire. The packet commences with a preamble, followed by address data and packet data and finally the frame check sequence. If the start of the packet is delayed, the inter-packet gap will increase. This means that packets will not be transmitted at their fastest rate though the advantage is the packets are less likely to be corrupted.

Further features of the invention will be apparent from the following detailed description with reference to the accompanying drawings.

DETAILED DESCRIPTION OF PREFERRED EXAMPLE

Figure 1:
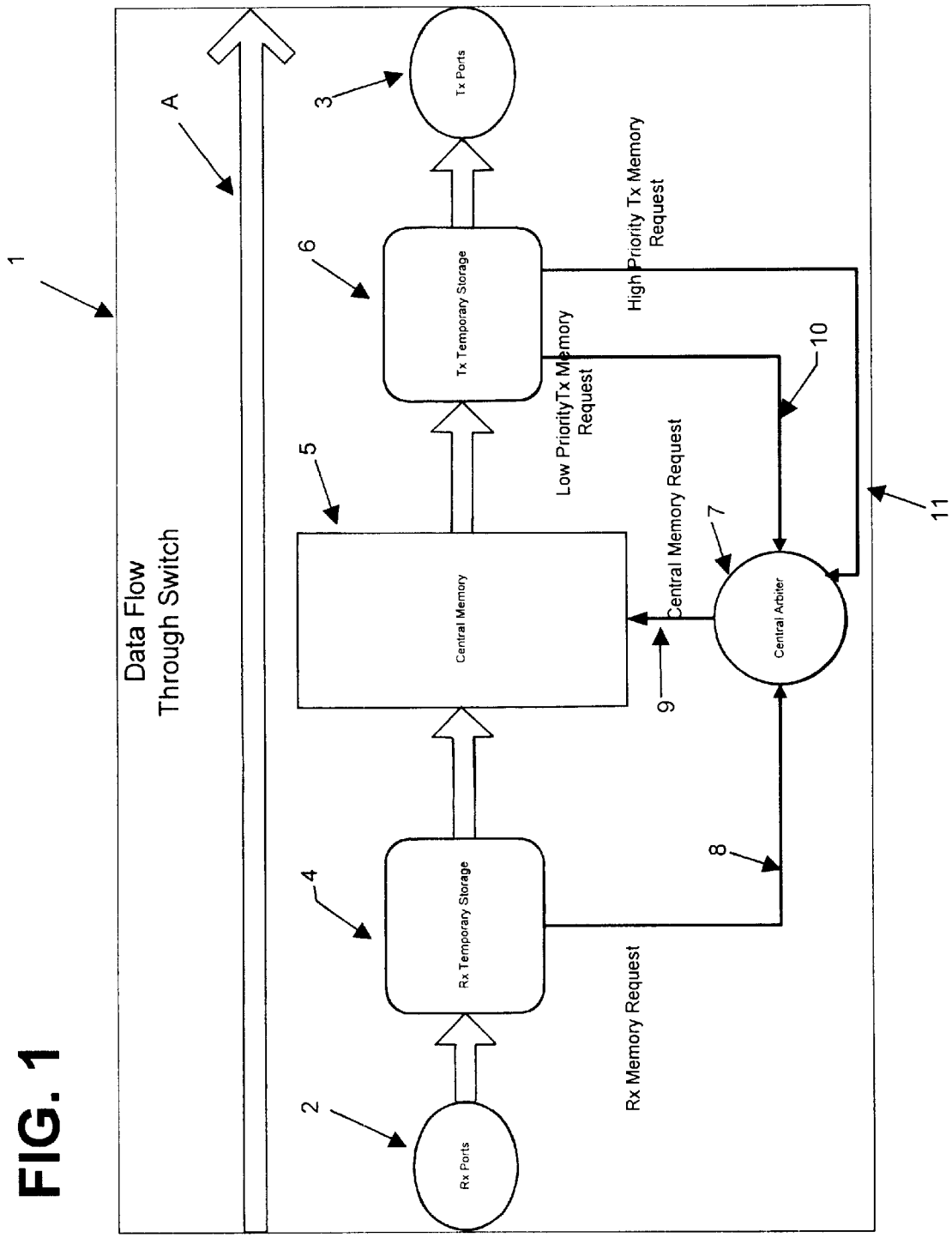
FIG. 1 indicates schematically a switch organised with a priority request system according to the invention.

The switch 1 shown in the FIG. 1 has a data flow through it generally indicated by the arrow "A." FIG. 1 is a schematic representation for the purposes of explanation.

The switch 1 has a multiplicity of receive ports 2 and a multiplicity of transmit ports 3. As indicated previously, the ports 2 and 3 may be at least partly constituted by ports that have both a transmit and a receive function. Each of the ports 2 has an allotted memory space in an Rx temporary store 4 while each of the transmit ports 3 has a respective allotted memory space in a Tx temporary store 6. Typically, the temporary stores 4 and 6 form a respective queue for each of the respective ports. Packet data can be written in bursts from the Rx temporary storage 4 into a common central memory 5 and data can be read in bursts from the common central memory 5 to the Tx temporary storage 6.

The reading in of data to the common central memory 5 from the temporary storage 4 and the read out of data from the central memory 5 to the transmit store is controlled by a central arbiter 7. This acts on (i.e. grants) requests from the Rx temporary storage 4 and shown by the line 8, for the writing of data to the central memory and controls the writing process and the allocation of buffers to the data read in from the Rx temporary storage 4 by means of appropriate control signals shown by the line 9. The central arbiter 7 also acts on (i.e. grants) requests from the Tx temporary storage 6 for data to be read out from the central memory 5 to the transmit temporary storage 6 for onward transmission by way of the ports 3.

The basis of the present invention is the employment of different types of read requests to the central arbiter 7 from the Tx temporary storage 6. The read requests comprise a low priority request, shown by line 10, which is provided at the beginning of a packet The low priority request from the Tx temporary storage 6 is of lower priority than the write requests from the Rx temporary storage 4. Thus if the central memory is oversubscribed, then it is these requests that are left until last to be serviced and so will have the highest latency. The second request, shown by line 11, from the transmit ports is a high priority request which has higher priority than the read request from the Rx ports and is inserted for all Tx bursts in memory after the first. This means that as soon as transmission of a packet has begun it will have no data corruption due to underrun. However, too many high priority Tx requests would cause the receive function to overrun. This problem is countered by the fact that each Tx port can only issue a limited number of high priority of requests before transmission of the current packet has finished. The next request from the latter will be a low priority request from the start of the next packet. Any backlog which may have built up in Rx while the high priority Tx requests were being serviced will now be cleared before transmission of the next Tx packet occurs. Thus an overrun in receive is prevented.

Figure 2:
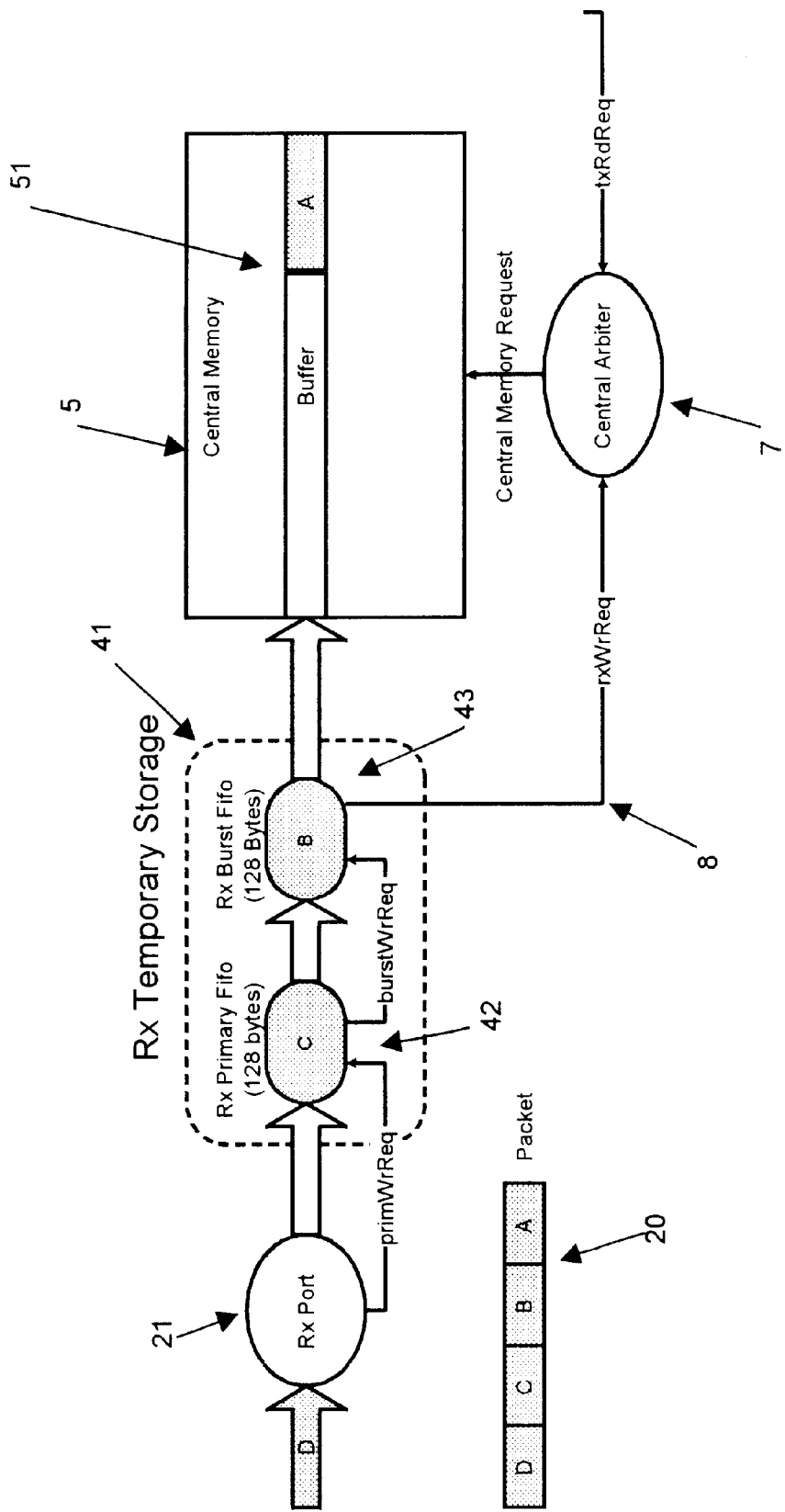
FIG. 2 illustrates the receive side of the switch and its operation in greater detail.

FIG. 2 illustrates by way of example the receive side, up to the central memory, of the switch 1. For ease of explanation, the lookup and packet switching functions as well as the other functions not directly relevant to the present invention have been omitted.

FIG. 2 includes a schematic illustration of a data packet 20 which in this example has a length of 512 bytes, i.e. four bursts A, B, C and D of 128 bytes each. If the packet length is not an integral multiple of the burst length then the last burst will be shorter than the norm. FIG. 2 shows only a single receive port 21 and its temporary storage 41; the temporary storage is provided for each of the ports in the plurality of ports 2.

The central memory is implemented in a block of Dynamic Random Access Memory (DRAM). Packet data is retrieved from the memory in fixed size bursts because in doing so more efficient use is made of the available DRAM bandwidth. This fixed size of burst is 128 bytes As illustrated in FIG. 2 packet data received at the receive port 21 is stored in a Receive Primary Fifo (Rx Primary Fifo 42) subsequent to a write request (primWrReq). The packet data is transferred to a Receive Burst Fifo (Rx Burst Fifo 43) subsequent to a respective write request (burstWrReq). Once the Burst Fifo 43 is full a burst request is passed to the central memory arbiter along with the address in central memory of the first word in the burst and the size of the burst (128 bytes or less if it is the last burst of the packet).

Up to a maximum of 12 bursts of 128 bytes may be necessary to transfer an entire packet to the central memory, depending on the size of the packet. Similarly up to 12 bursts of 128 may be required when retrieving a packet from central memory on the transmit side.

The central memory arbiter includes an appropriate mechanism (implemented partly in software) for ordering the read and write requests that it receives. Such mechanisms are known per se. For reasons which will soon be apparent, write requests from the Rx Burst Fifo 43 are preferably given an intermediate priority in the central arbiter 7.

FIG. 2 illustrates a stage in the transfer of a packet into a buffer space 51 in the central memory 5. The first section A has been 'burst' into the buffer 51, the second section B is in Rx Burst Fifo 43 awaiting transfer to the central memory in response to the write request rxWrReq, section C is in the Rx Primary Fifo 42 and section D is being received at the port 21.

On the transmit side, the transmit function obtains the details of the next packet to be transmitted. The source of these details is not relevant to the invention and so is not shown in the Figure. For the purposes of this discussion this packet will be referred to as Tnext. These details include the buffer address in central memory and size of the packet and are used to calculate the start address and size of each of the bursts required to retrieve the packet Tnext from memory.

Figure 3:
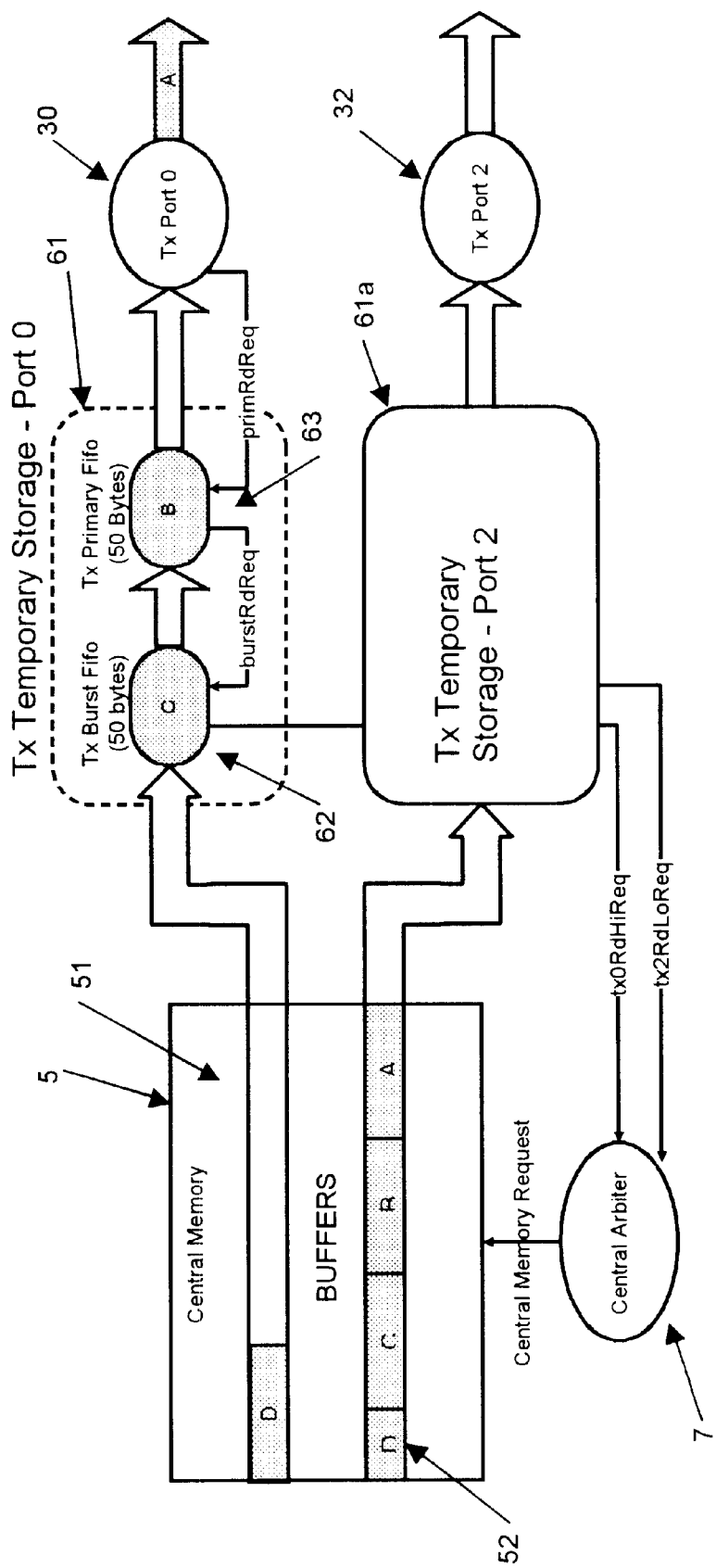
FIG. 3 illustrates the transmit side of the switch and its operation in greater detail.

FIG. 3 illustrates the transmit side and shows the temporary storage 61 associated with transmit port 30 (TxPort0)

and identical temporary storage 61a associated with transmit port 32 (Tx Port 2). The temporary storage 61 comprises a Tx Burst Fifo 62 followed by a Tx Primary Fifo 63 . FIG. 3 shows two packets, which have been stored in buffers 51 and 52 in the memory 5 and are being or about to be transferred to the ports 30) and 32 respectively.

As illustrated in FIG. 3), burst read requests are asserted by the Transmit Burst Fifo to the central memory arbiter. These requests are accompanied by the address of the first word of the burst and the size of the burst. The data retrieved from the central memory is stored in the Transmit Burst Fifo and from there it is transferred to the Transmit Primary Fifo and on to the Transmit port in response to the respective requests 'burstRdReq' and 'prinmkdReq'.

The first burst request issued for the packet Tnext is a low priority request, thus the central memory arbiter 7 will treat any burst write requests from the Receive Burst Fifo with higher priority than the former low priority request from the Transmit Burst Fifo.

In FIG. 3, Tx Temporary Storage is empty, so the initial request (tx2RdLoReq) for the data packet in buffer space 52 is a low priority request. The Figure shows the data packet previously stored in buffer space 51 being transferred to port 30, section A being transmitted 'on the wire' from the port, section B being about to be read from Tx Primary Fifo 63 to the port, section C being about to be read from Tx Burst Fifo 62 into the Tx Primary Fifo 63 and section D being still in buffer space 51. Reading out of section D is performed in response to a high priority request (txORdHiReq) from Fifo 62 as that empties.

Thus, after the initial, low priority request for the reading of the packet Tnext, subsequent read requests issued by the Transmit Burst Fifo for packet Tnext will be high priority requests and the central memory arbiter 7 will treat the former requests with higher priority than initial requests from other transmit temporary stores and with higher priority than burst write requests from the Receive Burst Fifos. If the packet Tnext is of maximum length, a total of 11 high priority burst requests will be issued by the respective Transmit Burst Fifo, after which the Transmit Fifo's next read request is guaranteed to be a low priority request, (being the start of next transmit packet). Any backlog which may have built up in the Receive block while the high priority transmit requests were being processed will now be cleared (since they are of intermediate priority) before retrieval of the next Transmit packet begins. The request priorities are summarised in the table below, where 'one' is the highest priority.

| Burst Request Type | Priority |
|---|---|
| Transmit Burst Fifo Read High Priority | one |
| Receive Burst Fifo Write | two |
| Transmit Burst Fifo Read Low Priority | three |

What is claimed is:

1. A multi-port data communication device including a multiplicity of receive ports, a multiplicity of transmit ports, a first respective temporary storage space for packets received from a receive port, a second respective temporary storage space for packets that are to be forwarded from a transmit port, and a common central memory interposed between the first and second temporary storage spaces whereby all data packets must pass through the common central memory, means for writing packet data into said common memory space in bursts in dependence on the grant of respective receive write requests; means for reading packet data from said common memory space in bursts in dependence on the grant of respective transmit read requests; and a central arbiter for receiving said requests and determining the order in which they are performed by the common central memory, wherein a transmit read request for a first burst of data in a packet has in said central arbiter a relatively low priority and transmit read requests for a second and any subsequent burst of data in a packet have in said central arbiter a relatively high priority.

2. A multi-port data communication device including a multiplicity of receive ports, a multiplicity of transmit ports, a first respective temporary storage space for packets received from a receive port, a second respective temporary storage space for packets that are to be forwarded from a transmit port, and a common central memory interposed between the first and second temporary storage spaces whereby all data packets must pass through the common central memory; means for writing packet data into said common memory space in bursts in dependence on the grant of respective receive write requests; means for reading packet data from said common memory space in bursts in dependence on the grant of respective transmit read requests; and a central arbiter for receiving said requests and determining the order in which they are performed by the common central memory; wherein a transmit read request for a first burst of data in a packet has in said central arbiter a relatively low priority and transmit read requests for a second and any subsequent burst of data in a packet have in said central arbiter a relatively high priority; and wherein said receive write requests have in said central arbiter a priority intermediate said relatively low priority and said relatively high priority.

3. A device according to claim 1 wherein each first respective storage space includes a fifo for storing packet data corresponding to the size of a burst.

4. A device according to claim 1 wherein each first respective storage space comprises two fifos in tandem each organised to receive and transmit packet data in a burst.

5. A device according to claim 1 wherein each second respective storage space includes a fifo for storing packet data corresponding to the size of a burst.

6. A device according to claim 1 wherein each second respective storage space comprises two fifos in tandem, each organised to receive and transmit packet data in a burst.

7. A device according to claim 2 wherein each first respective storage space includes a fifo for storing packet data corresponding to the size of a burst.

8. A device according to claim 2 wherein each first respective storage space comprises two fifos in tandem each organized to receive and transmit packet data in a burst.

9. A device according to claim 2 wherein each second respective storage space includes a fifo for storing packet data corresponding to the size of a burst.

10. A device according to claim 2 wherein each second respective storage space comprises two fifos in tandem, each organized to receive and transmit packet data in a burst.

* * * * *